United States Patent
Xia et al.

(10) Patent No.: US 10,805,669 B2
(45) Date of Patent: Oct. 13, 2020

(54) METHOD, SYSTEM AND APPARATUS FOR AUTOMATICALLY STARTING RECORDING

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Bing Xia, Beijing (CN); Chao Yu, Beijing (CN); Zhengxuan Lv, Beijing (CN); Qi Zhang, Beijing (CN); Rui Liu, Beijing (CN); Yanchao Zhang, Beijing (CN); Zongli Gao, Beijing (CN); Junjie Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 16/015,172

(22) Filed: Jun. 21, 2018

(65) Prior Publication Data
US 2019/0208261 A1 Jul. 4, 2019

(30) Foreign Application Priority Data

Jan. 2, 2018 (CN) .......................... 2018 1 0003066

(51) Int. Cl.
*H04N 21/433* (2011.01)
*G06F 3/0484* (2013.01)
(Continued)

(52) U.S. Cl.
CPC ....... *H04N 21/4334* (2013.01); *G06F 1/1684* (2013.01); *G06F 1/1694* (2013.01);
(Continued)

(58) Field of Classification Search
CPC .. G06F 3/0346; G06F 3/0484; H04N 21/4334
(Continued)

(56) References Cited

U.S. PATENT DOCUMENTS

2011/0111805 A1* 5/2011 Paquier ............. H04M 1/72552
455/563
2011/0238191 A1* 9/2011 Kristjansson ......... G06F 1/1626
700/94
(Continued)

FOREIGN PATENT DOCUMENTS

CN    103152474 A  *  6/2013
CN    103152474 A     6/2013
(Continued)

OTHER PUBLICATIONS

First Chinese Office Action dated Dec. 26, 2019, received for corresponding Chinese Application No. 201810003066.4, 16 pages.
(Continued)

*Primary Examiner* — Thai Q Tran
*Assistant Examiner* — Stephen R Smith
(74) *Attorney, Agent, or Firm* — Kinney & Lange, P.A.

(57) ABSTRACT

A method, a system and an apparatus for automatically starting recording is disclosed. The method includes: detecting whether there is a preset recording startup button in a display interface of a terminal device; acquiring a sensor signal if there is the recording startup button, and determining whether the sensor signal meets a preset automatic recording condition; and starting a recording function automatically if the automatic recording condition is met.

10 Claims, 5 Drawing Sheets

(51) Int. Cl.
*G06F 3/0346* (2013.01)
*G06F 1/16* (2006.01)
*G06F 3/16* (2006.01)
*G06F 3/01* (2006.01)

(52) U.S. Cl.
CPC ............ *G06F 3/017* (2013.01); *G06F 3/0346* (2013.01); *G06F 3/0484* (2013.01); *G06F 3/16* (2013.01)

(58) Field of Classification Search
USPC ...... 386/224, 227; 348/77, 143; 700/94, 251
See application file for complete search history.

(56) References Cited

U.S. PATENT DOCUMENTS

| 2012/0136943 | A1* | 5/2012 | Paul | G06Q 10/107 709/206 |
| 2014/0028826 | A1* | 1/2014 | Lee | G10L 15/25 348/77 |
| 2015/0006161 | A1 | 1/2015 | Ren et al. | |
| 2015/0161992 | A1* | 6/2015 | Jung | G10L 15/083 704/251 |
| 2015/0234633 | A1 | 8/2015 | Wang et al. | |
| 2018/0158450 | A1* | 6/2018 | Tokiwa | G06K 9/00221 |
| 2018/0253229 | A1* | 9/2018 | Nagasaka | G06F 16/95 |
| 2018/0262724 | A1* | 9/2018 | Ross | H04N 7/188 |
| 2018/0309801 | A1* | 10/2018 | Rathod | H04L 51/04 |
| 2019/0089825 | A1* | 3/2019 | Scott | H04M 1/7255 |

FOREIGN PATENT DOCUMENTS

| CN | 103259926 | A | | 8/2013 |
| CN | 103544970 | A | | 1/2014 |
| CN | 104252330 | A | | 12/2014 |
| CN | 104851446 | A | | 8/2015 |
| CN | 105049612 | A | | 11/2015 |
| CN | 106453910 | A | * | 2/2017 |
| CN | 106453910 | A | | 2/2017 |

OTHER PUBLICATIONS

Second Chinese Office Action dated Aug. 13, 2020, for corresponding Chinese Application No. 201810003066.4.

* cited by examiner

METHOD, SYSTEM AND APPARATUS FOR AUTOMATICALLY STARTING RECORDING

CROSS-REFERENCE TO RELATED APPLICATION(S)

This application claims priority to Chinese Patent Application No. 201810003066.4, entitled "Method, System and Apparatus for Automatically Starting Recording," filed on Jan. 2, 2018, which is incorporated herein by reference in its entirety.

TECHNICAL FIELD

The present disclosure relates to the technical field of recording startup of terminal devices, and in particular to a method, system, and apparatus for automatically starting recording.

BACKGROUND

With the rapid development of smart technologies, especially the development of Internet-based network communications, smart terminals are increasingly becoming an indispensable auxiliary tool in people's lives, and more and more functions are included in these smart terminals, thereby bringing a more convenient experience to the user. For example, at present, smart terminals have been able to recognize changes in the position of the terminal through built-in sensors and respond to this accordingly in a system. Typical applications that use such a function include an application having a shake function in the smart terminal and a health-related application having a pedometer function.

SUMMARY

The present disclosure provides a method for automatically starting recording, comprising:
detecting whether there is a preset recording startup button in a display interface of a terminal device;
acquiring a sensor signal in response to detecting the recording startup button, and determining whether the sensor signal meets a preset automatic recording condition; and
starting a recording function automatically in response to determining that the automatic recording condition is met.

Optionally, detecting whether there is a preset recording startup button in a display interface of a terminal device comprises:
detecting button modules in the display interface and graphic and textural information in each of the button modules;
comparing the button module and the graphic and textural information with a preset recording startup button database, wherein the recording startup button database is a collection of button modules and graphic and textural information for the recording startup button for starting the recording function; and
determining whether there is the recording startup button in the display interface according to a comparison result.

Optionally, the sensor signal includes an acceleration sensor signal and/or an infrared sensor signal, and wherein the acceleration sensor signal indicates motion information of the terminal device, and the infrared sensor signal indicates position information of the terminal device.

Optionally, determining whether the sensor signal meets a preset automatic recording condition comprises:

determining whether an acceleration represented by the acceleration sensor signal has been subjected to a transition from positive to negative,
determining whether the infrared sensor signal is detected in response to determining that the acceleration has been subjected to a transition from positive to negative, and
determining whether the sensor signal meets the preset automatic recording condition in response to detecting the infrared sensor signal.

Optionally, after starting a recording function automatically, the method further comprises:
determining whether the infrared sensor signal disappears, and stopping the recording function in response to determining the infrared sensor signal disappears.

Optionally, the method further comprises:
stopping the recording function and acquiring recording information recorded by the recording function; and
prompting a user to determine whether it is necessary to convert the recording information into text information for transmission.

The present disclosure further provides a system for automatically starting recording, comprising:
a display, configured to display a display interface of a terminal device;
a controller, configured to scan the display and detecting whether there is a preset recording startup button in the display interface, send a detection instruction to a sensor module in response to detecting a preset recording startup button, receive a sensor signal sent by the sensor module, determine whether the sensor signal meets a preset automatic recording condition, and send a recording startup instruction to a recording circuit in response to determining that the preset automatic recording condition is met;
the sensor module, configured to enable a sensor in response to receiving the detection instruction sent by the controller, and feedback the detected sensor signal to the controller; and
the recording circuit, configured to start a recording function in response to receiving the recording startup instruction sent by the controller.

Optionally, the controller comprises a CPU and a microprocessor,
the CPU is configured to scan the display and detect whether there is the preset recording startup button in the display interface, and instruct the microprocessor to acquire the sensor signal in response to detecting the preset recording startup button, and
the microprocessor is configured to acquire the sensor signal sent by the sensor module in response to receiving an instruction of acquiring the sensor signal sent by the CPU and determine whether the sensor signal meets the preset automatic recording condition, and instruct the CPU to send the recording startup instruction to the recording circuit in response to determining that the preset automatic recording condition is met.

Optionally, the sensor module includes an acceleration sensor and an infrared sensor, and wherein the acceleration sensor is configured to detect motion information of the terminal device, and the infrared sensor is configured to detect position information of the terminal device.

Optionally, the automatic recording condition is met if the acceleration detected by the acceleration sensor transits from positive to negative and the infrared sensor detects an infrared signal.

The present disclosure further provides an apparatus for automatically recording comprising the system for automatically starting recording.

Optionally, the controller comprises a CPU and a microprocessor, the CPU is configured to scan the display and detect whether there is the preset recording startup button in the display interface, and instruct the microprocessor to acquire the sensor signal in response to detecting the preset recording startup button, and the microprocessor is configured to acquire the sensor signal sent by the sensor module in response to receiving an instruction of acquiring the sensor signal sent by the CPU and determine whether the sensor signal meets the preset automatic recording condition, and instruct the CPU to send the recording startup instruction to the recording circuit in response to determining that the preset automatic recording condition is met.

Optionally, the sensor module includes an acceleration sensor and an infrared sensor, and wherein the acceleration sensor is configured to detect motion information of the terminal device, and the infrared sensor is configured to detect position information of the terminal device.

DETAILED DESCRIPTION

In order to make the purpose, technical solutions, and advantages of the present disclosure clearer, the following further describes the present disclosure in detail with reference to specific embodiments and with reference to the accompanying drawings.

It should be noted that all the expressions using "first" and "second" in the embodiments of the present disclosure are for distinguishing between two different entities or different parameters with the same name. "First" and "second" are merely for convenience of description and should not be construed as limiting the embodiments of the present disclosure, and the subsequent embodiments will not describe them one by one.

For current terminal devices, more and more applications have a voice recording function embedded in a dialog box that needs typing input. For example, chat tools such as Wechat and QQ can send voice messages; and shopping applications such as Jingdong and Taobao have a microphone-style icon embedded in a search bar to indicate that searching goods by voice messages are supported. However, in the related art, when recording a voice message, the recording function may be started only when a lower part of a screen (such as a speaking area) is manually pressed. Such a pressing operation is not complicated, but if the number of operations is large every day, it will still bring the user inconvenience. It may be very inconvenient for a user because the size of the screen of a terminal device (such as a mobile phone) becomes larger and larger, and the speaking button to be pressed is generally at the lower part of the screen. Furthermore, a maloperation cannot be avoided when the user clicks or press the speaking button.

The present disclosure proposes a new way to record a voice message based on an acceleration sensor and an infrared sensor that is additionally configured in a terminal device, thereby making it easier for people to use a terminal device such as a mobile phone.

Figure 1:
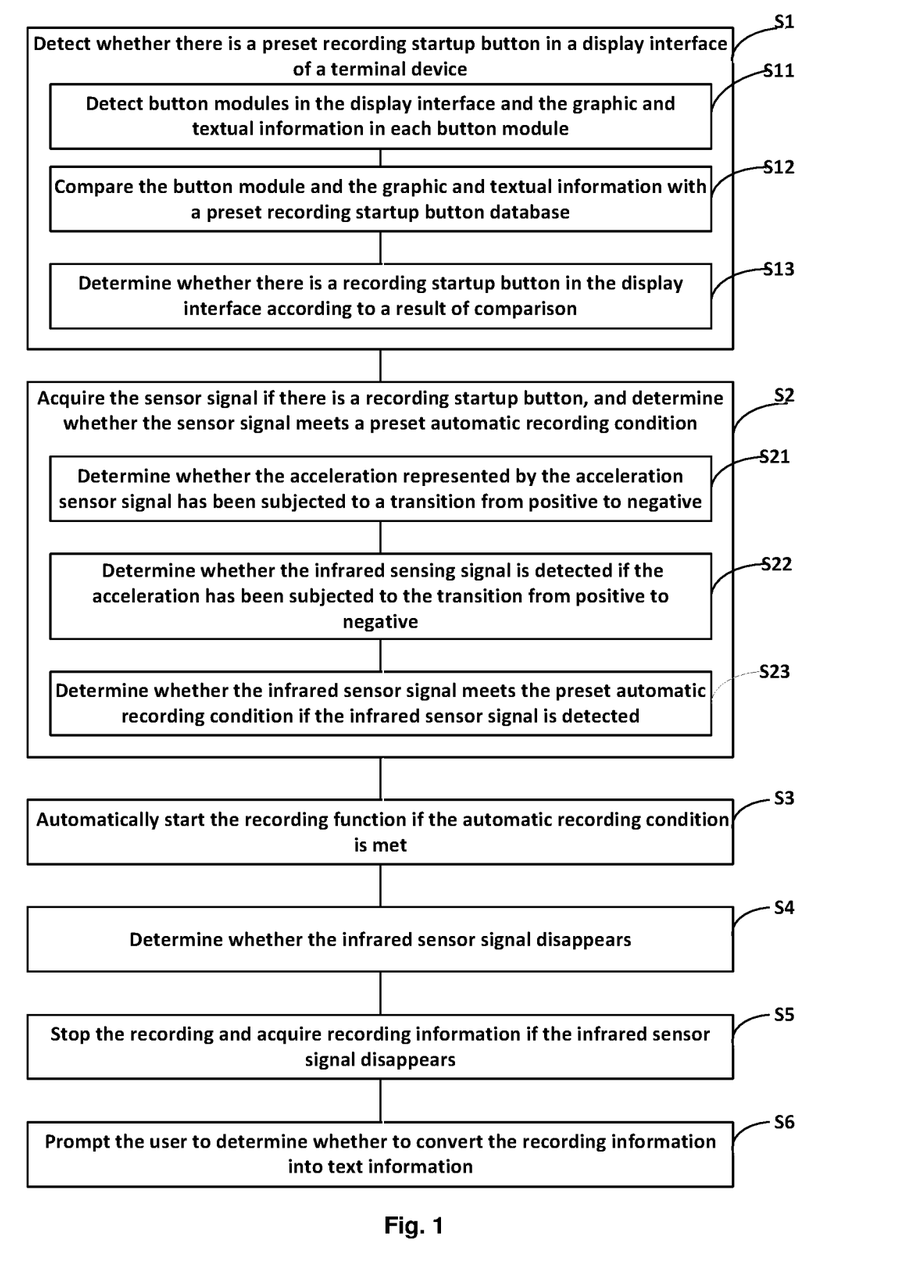
FIG. 1 illustrates a flowchart of a method for automatically starting recording according to an embodiment of the present disclosure.

With reference to FIG. 1, which illustrates a flowchart of a method for automatically starting recording according to an embodiment of the present disclosure, the method for automatically starting recording comprises the following steps.

At step S1, it is detected whether there is a preset recording startup button in a display interface of a terminal device. If a user desires to start a recording function, a corresponding application interface or function menu shall be entered. For example, in some dialog applications, a user can only click a corresponding recording startup button to start recording after an input stage is entered. The recording/recording function refers to the collection of audio information sent by the user, including simple recording, voice input or AI dialogue and so on. The present disclosure detects whether there is a recording startup button in the display interface in order to achieve better compatibility with various related applications, so that it can implement the automatic start of the recording function described in the present disclosure no matter which application the user uses, instead of using an independent shortcut. A scheme of the present disclosure is more practical and accurate.

In some alternative embodiments of the present disclosure, step S1 at which it is detected whether there is a preset recording startup button in a display interface of a terminal device comprises steps S11, S12 and S13.

At step S11, button modules in the display interface and the graphic and textual information in each of the button modules are detected. The button module may be a button unit of a virtual button in the display interface, and may also be another form of a button unit. The graphic and textual information may be individual textual information, symbol information, picture information, or a combination of multiple types of information. The present disclosure does not limit specific format and content of the graphic and textual information. Here, the combination of the button module and the graphic and textual information is used mainly to avoid that some screenshots, pictures, and the like existing in the display interface are mistakenly considered as the recording startup button, and the combination of the button module and the graphic and textual information can accurately identify the recording startup button, thereby improving accuracy and reliability of the automatic startup recording process.

At step S12, the button module and the graphic and textual information are compared with a preset recording startup button database. The recording startup button database is a collection of button modules and graphic and textual information for a recording startup button for starting a recording function. Thus, as long as the button modules and graphic and textual information for all available recording startup buttons are acquired in advance and the recording startup button database is constructed, they can be used during subsequent processes. Accurate identification of the recording startup button may be implemented through detection of the display interface and comparison with the recording startup button database.

Alternatively, the user can also add new button modules and graphic and textual information to the recording startup button database corresponding to the terminal device of the user through a first use operation, according to the button modules and graphic and textual information in the interface, so that the user may add new items in the recording startup button database for a new or unusual recording startup button for subsequent automatic startups, in order to achieve better compatibility.

At step S13, it is determined whether there is a recording startup button in the display interface according to a result of comparison.

At step S2, if there is a recording startup button, a sensor signal is acquired and it is determined whether the sensor signal meets a preset automatic recording condition. If there is no recording startup button in the display interface, it means that it does not need to perform recording. Therefore, it does not need to make any response. If there is a recording startup button, a further determination is needed. In an embodiment of the present disclosure, the sensor signal of the terminal device is acquired and then it is determined whether the preset automatic recording condition is met based on the acquired sensor signal. If the preset automatic recording condition is met, it indicates that it needs to perform recording operations, so step S3 is performed for automatically starting a recording function without the user clicking the recording startup button.

In some embodiments of the present disclosure, the sensor signal includes an acceleration sensor signal and/or an infrared sensor signal. The acceleration sensor signal indicates motion information of the terminal device, and the infrared sensor signal indicates position information of the terminal device.

Alternatively, the step of determining whether the sensor signal meets the preset automatic recording condition comprises steps S21, S22 and S23.

At step S21, it is determined whether an acceleration represented by the acceleration sensor signal has been subjected to a transition from positive to negative. In the embodiment of the present disclosure, the acceleration sensor in the terminal device is used to detect whether the user has moved the terminal device to his/her mouth. Since the movement is a static-dynamic-static process, the acceleration of the terminal device here necessarily has been subjected to the transition from positive to negative. This is also fully consistent with the common process of moving the mobile phone to the mouth when a user needs speech interaction, and this is also an inevitable process.

At step S22, if the acceleration has been subjected to the transition from positive to negative, it is further determined whether an infrared sensing signal is detected. Although the movement of the user's mobile device will inevitably cause the transition of the acceleration, the transition of the acceleration does not necessarily indicate that the user moves the mobile device to the user's mouth. The infrared sensor is enabled to determine whether the infrared sensor can detect the infrared sensor signal. If the infrared sensor signal can be detected, it indicates that the user has moved the mobile device to the mouth, and the user's chin or neck is detected by the infrared sensor. From the above analysis, in this embodiment, an infrared sensor needs to be set at the voice receiving position of the mobile device, and a detection range of the infrared sensor is selected so that a result of the detection is more accurate and reliable. For example, an infrared detection module is set at the bottom of the mobile device.

At step S23, if the infrared sensor signal is detected, it is determined whether the infrared sensor signal meets the preset automatic recording condition.

It should be noted that the above process of determining the automatic recording condition by the accelerometer and the infrared sensor is only an exemplified embodiment. According to the specific use of the terminal device, other implementations of automatic recording conditions may also be used, and the present disclosure isn't limited to this.

At step S3, if the automatic recording condition is met, the recording function is automatically started. If it is determined that the automatic recording condition is not met based on the acquired sensor signal, it does not need to automatically start the automatic recording function. That is, no response is required.

It can be known from the above embodiments that the method for automatically starting recording according to the present disclosure detects whether there is a preset recording startup button in the display interface of the terminal device, thereby determining whether the user desires to use the recording function or not, and then determines whether the preset automatic recording condition is met. If it is met, it indicates that the user desires to start recording function in the display interface with the recording function embedded, and the recording function can be automatically started without the user clicking the corresponding recording startup button. In this way, not only the speed and efficiency of the startup of the recording function are greatly improved, but also the user's operation process is simplified, and the user is provided with a more convenient use experience. In addition, omission of the process of clicking the recording startup button can also avoid the problem that the user is prone to incorrectly operate during the click process, so that the user can achieve a more accurate recording startup process. Therefore, the method for automatically starting recording in the present disclosure can simplify the operation of the user in using the recording function or the voice communication function, so that the user can realize a more convenient recording experience and avoid the maloperation caused by clicking.

Figure 2:
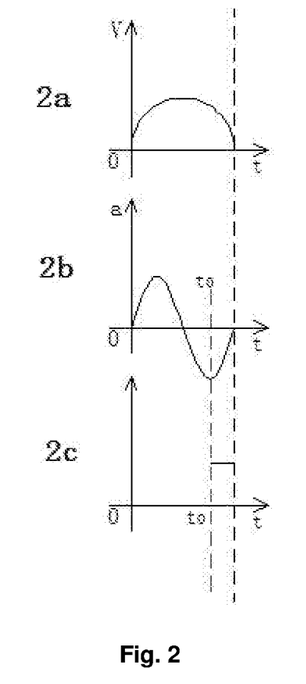
FIG. 2 illustrates a diagram of changes in signals of an acceleration sensor and an infrared sensor according to an embodiment of the present disclosure.

Referring to FIG. 2, there is shown a schematic diagram of changes in signals of an acceleration sensor and an infrared sensor according to an embodiment of the present disclosure. As shown in (2a) of FIG. 2, the moving speed V of the mobile terminal has been subjected to a process from increasing to decreasing during the process of moving the terminal device to the mouth. Correspondingly, as shown in (2b) of FIG. 2, the acceleration (a) of the mobile terminal will have been subjected to a transition from positive to negative. At the same time, after the end of the transition of the acceleration, it needs to determine whether there is an infrared signal according to the infrared sensor signal, as shown in (2c) of FIG. 2. Only if the above processes are all satisfied, is it indicated that the automatic recording condition described in the embodiment is met.

Figure 3:
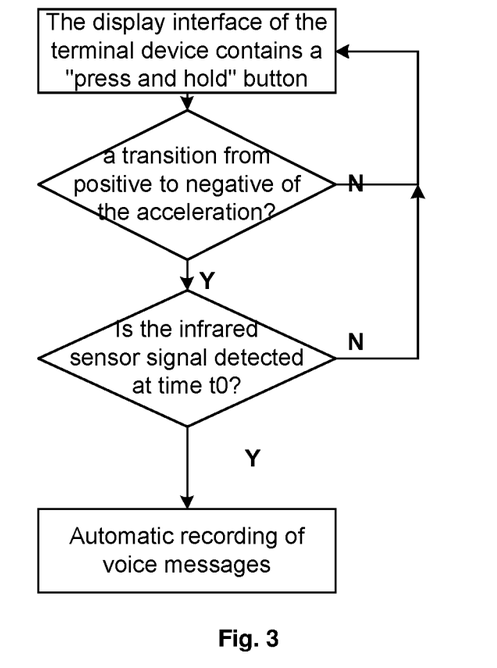
FIG. 3 illustrates a flowchart of an example of determining whether or not the automatic recording condition is met according to an embodiment of the present disclosure.

Referring to FIG. 3, there is shown a flowchart of an example of determining whether or not the automatic recording condition is met according to an embodiment of the present disclosure. In this embodiment, the process of determining whether the automatic recording condition is met includes: first, detecting whether the display interface of the terminal device includes a button such as "press and hold"; if the display interface includes a "press and hold" button, according to detection of the acceleration sensor, it is determined whether the acceleration undergoes a transition from positive to negative. If not, no operation is required; otherwise if it is subjected to the transition, it is determined whether the infrared module at the bottom of the terminal device detects an infrared signal at the end (time t0) of transition from positive to negative of the acceleration. If no signal is detected, no operation is performed. If the infrared signal is detected, the recording function is automatically started.

In some embodiments of the present disclosure, the automatically starting the recording function further comprises steps S4 and S5.

At step S4, it is determined whether the infrared sensor signal disappears.

At step S5, if the infrared sensor signal disappears, the recording function stops. The disappearance of the infrared sensor signal indicates that the user has moved the terminal device away from the mouth, i.e., the recording is not needed any more. At this time, the recording function can be automatically stopped and the recording information recorded by the recording function can be obtained.

Alternatively, the automatically starting the recording function further comprises step S6.

In step S6, after the recording function stops and recording information recorded by the recording function is acquired, the user is prompted to determine whether it is necessary to convert the recording information into text information for transmission, or it is not necessary to convert the recording information into text information, rather the recording information is to be transmitted directly. Since not all recording processes are for the purpose of acquiring recording information, such as some speech inputs or intelligent dialogue sessions, it is necessary to further determine whether or not the recording information is needed to be converted into text information so that the user can obtain more useful information according to his own needs. As a result, the user's experience and convenience are ultimately improved.

Figure 4:
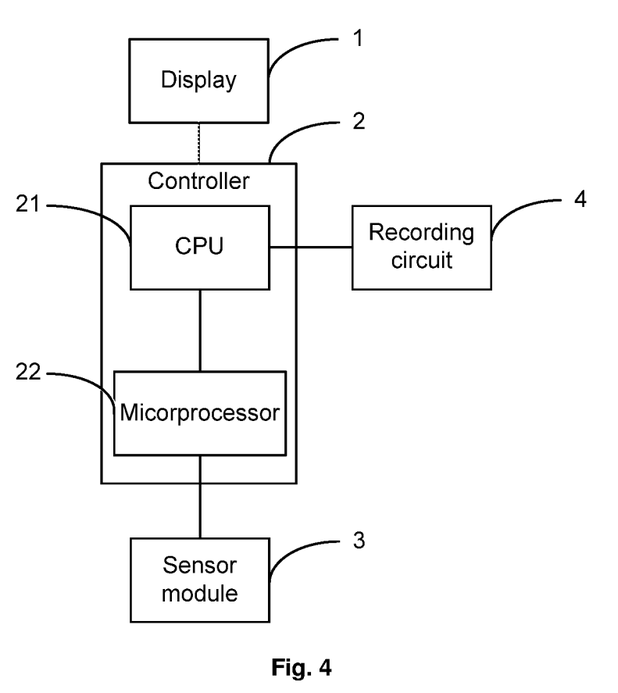
FIG. 4 illustrates a structure diagram of a system for automatically starting recording according to an embodiment of the present disclosure.

Referring to FIG. 4, there is shown a structure diagram of a system for automatically starting recording according to an embodiment of the present disclosure. The system for automatically starting recording includes a display 1, a controller 2, a sensor module 3, and a recording circuit 4.

The display 1 is configured to display a display interface of the terminal device, for example, a display screen in a mobile phone or a tablet.

The controller 2 is configured to scan the display 1 and detect whether there is a preset recording startup button in the display interface, and send a detection instruction to the sensor module 3 if there is the recording startup button.

The sensor module 3 is configured to receive the instruction sent by the controller 2 to enable the sensor, and feedback the detected sensor signal to the controller 2.

The controller 2 is further configured to receive a sensor signal sent by the sensor module 3 and determine whether the sensor signal meets a preset automatic recording condition, and send a recording startup instruction to the recording circuit 4 if the automatic recording condition is met.

The recording circuit 4 is configured to receive the recording startup instruction sent by the controller 2 and start a recording function. The recording circuit 4 can be either a recording circuit provided internally in an application or a recording circuit separately provided from the application.

Compared with the related art, the solution of the present disclosure makes the operation on the most frequently used basic functions of a terminal device such as mobile phones more concise, and eliminates the possible misoperation caused by the simple and repeated operations, thereby bringing the user a better experience.

In some optional embodiments of the present disclosure, the controller 2 includes a CPU unit 21 and a microprocessor 22.

The CPU unit 21 is configured to scan the display 22 and detect whether there is the preset recording startup button in the display interface, and instruct the microprocessor to acquire a sensor signal if there is the recording startup button.

The microprocessor 22 is configured to receive an instruction sent by the CPU, acquire the detection signal detected by the sensor module 3, determine whether the sensor signal meets a preset automatic recording condition, and instruct the CPU to send a recording startup instruction to the recording circuit if the automatic recording condition is met.

In some optional embodiments of the present disclosure, the sensor module 3 includes an acceleration sensor and an infrared sensor. The acceleration sensor is configured to detect motion information of the terminal device. The infrared sensor is configured to detect position information of the terminal device. The automatic recording condition is met if the acceleration detected by the acceleration sensor has been subjected to a transition from positive to negative and the infrared sensor detects an infrared signal.

Figure 5:
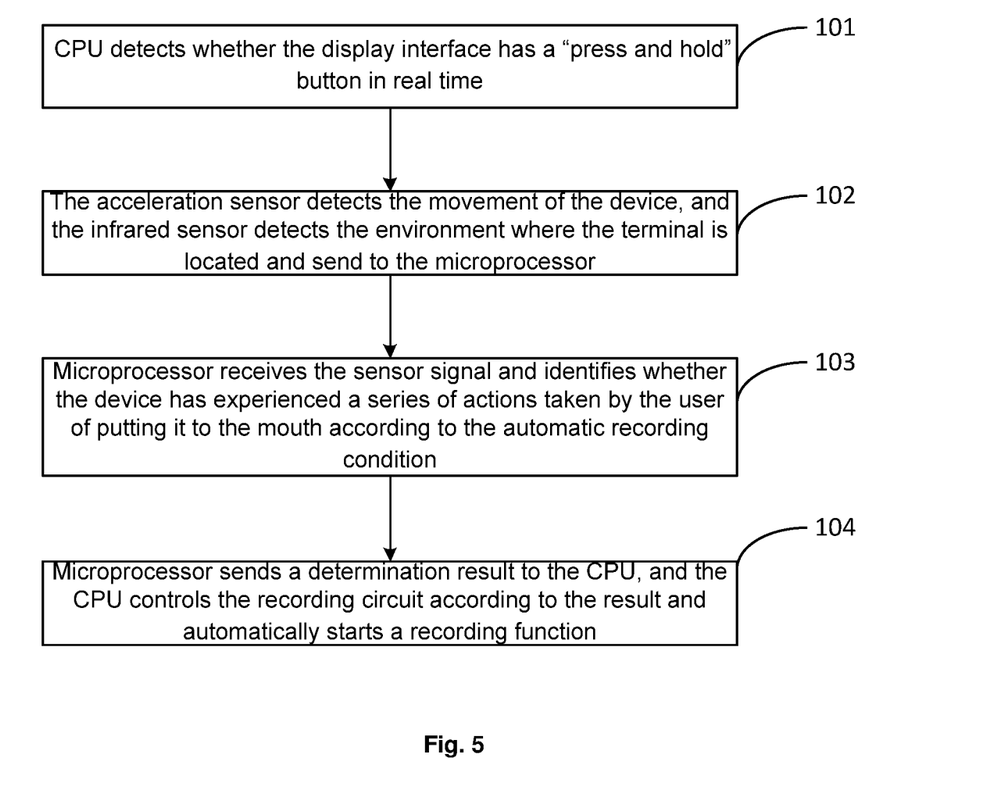
FIG. 5 illustrates a flowchart of a system for automatically starting recording according to an embodiment of the present disclosure.

Referring to FIG. 5, there is shown a flowchart of a system for automatically starting recording according to an embodiment of the present disclosure. A process of automatically starting recording is as follows.

At step 101, the CPU scans the display interface in real time to detect whether the display interface has a button such as "press and hold" button.

At step 102, if the display interface has a "press and hold" button, the CPU sends an instruction to the microprocessor, and the microprocessor receives the signal sent by the sensor module. The acceleration sensor detects the movement of the terminal device, and the infrared sensor detects environment where the terminal is located and send its result to the microprocessor.

At step 103, the microprocessor receives the sensor signal and identifies whether the terminal device has experienced a series of actions including being taken by the user and putting it to the mouth according to the automatic recording condition. That is, it is determined whether the automatic recording condition is met.

At step 104, the microprocessor sends a determination result to the CPU. If the automatic recording condition is met, the CPU controls the recording circuit according to the result and starts automatic recording. Further, when the infrared signal at bottom of the terminal device cannot be detected, it is prompted whether to use the recording information recorded by the recording function.

In some optional embodiments, a specific implementation of automatic start of a recording function of a chat software is provided as follows.

Taking WeChat as an example, when a terminal device runs WeChat and a display interface is a chat dialog box, the display interface contains a "press and hold" button. At this time, the CPU will detect the information and send an instruction to the microprocessor. The microprocessor receives the signals of the acceleration sensor and the infrared sensor at bottom, determines whether the automatic recording condition is met, and then feeds back the determination result to the CPU. If the automatic recording condition is met, the CPU sends an instruction to the recording circuit and starts recording. When the signal of the infrared signal at bottom disappears, it is indicated whether to use the recording information recorded by the recording function.

In some optional embodiments, a specific implementation of automatic start of a recording function of a search bar of a shopping software is provided as follows.

Taking the Jingdong application as an example, when the terminal device is running a Jingdong application, clicking a "microphone" icon in a search bar will display the "press and hold the product you want" button in the display interface. At this time, the CPU will detect the information and send an instruction to the microprocessor. The microprocessor receives the acceleration sensor and the infrared sensor signal at bottom, and determines whether the automatic recording condition is met. The microprocessor then feeds back the determination result to the CPU. If the automatic recording condition is met, the CPU sends an instruction to the recording circuit to start the recording function. When the infrared signal at bottom disappears, it is indicated whether to use the recording information recorded by the recording function.

As can be seen from the above embodiments, the present disclosure can be applied to a terminal device which is based on an acceleration sensor and an infrared sensor. The terminal device realizes the following function by identifying and processing the acceleration signal and the infrared sensor signal: when the user desires to send a voice message such as a voice or an intercom message, it is not necessary for the user to press and hold the "press and hold" button on the screen, while the user can speak directly to his/her mobile device. When the mobile device is put down, it is prompted whether to use the recording information directly.

The present disclosure also provides an automatic recording apparatus, which includes the above-described system for automatically starting recording. Therefore, the design concept in the present disclosure can be applied not only to terminal devices but also to other devices used for recording.

Persons of ordinary skill in the art should understand that the above discussion of any embodiment is merely exemplary and is not intended to imply that the scope of the present disclosure (including the claims) is limited to these examples. Under the concept of the present disclosure, the technical features in the above embodiments or different embodiments may also be combined, the steps may be implemented in any order, and there are many other variations of different aspects of the present disclosure as described above, which are not provided in the details for the sake of conciseness.

In addition, well known power/ground connections to integrated circuit (IC) chips and other components may or may not be shown in the drawings provided to simplify illustration and discussion, and so as not to obscure the disclosure. Moreover, the apparatus is shown in block form in order to avoid making the present disclosure difficult to understand, and this also takes into account the fact that the details regarding the implementation of the terminal devices are highly dependent on the platform on which the disclosure is to be implemented (i.e., these details should be completely within the understanding of those skilled in the art). Although specific details (e.g., circuitry) are set forth to describe example embodiments of the present disclosure, it will be apparent to those skilled in the art that the present disclosure can be implemented without these specific details or with changes to these specific details. Therefore, these descriptions should be considered as illustrative and not restrictive.

Although the present disclosure has been described in conjunction with specific embodiments thereof, many alternatives, modifications, and variations of these embodiments will be apparent to those skilled in the art in light of the foregoing description. For example, other memory architectures (e.g., dynamic RAM (DRAM)) may use the discussed embodiments.

The embodiments of the present disclosure are intended to cover all such alternatives, modifications, and variations that fall within the broad scope of the appended claims. Therefore, any omissions, modifications, equivalents, improvements, etc. made within the spirit and principles of this disclosure shall be included in the scope of protection of this disclosure.

We claim:

1. A method for automatically starting recording, comprising:
   detecting whether there is a preset recording startup button in a display interface of a terminal device;
   acquiring a sensor signal in response to detecting a recording startup button, wherein the sensor signal includes an acceleration sensor signal that indicates motion information of the terminal device and an infrared sensor signal that indicates position information of the terminal device;
   determining whether the sensor signal meets a preset automatic recording condition; and
   starting a recording function automatically in response to determining that the automatic recording condition is met,
   wherein determining whether the sensor signal meets a preset automatic recording condition comprises:
      determining whether an acceleration represented by the acceleration sensor signal has been subjected to a transition from positive to negative;
      determining whether the infrared sensor signal is detected in response to determining that the acceleration has been subjected to a transition from positive to negative, and
      determining the sensor signal meets the preset automatic recording condition in response to detecting the infrared sensor signal.

2. The method according to claim 1, wherein detecting whether there is the preset recording startup button in the display interface of the terminal device comprises:
   detecting button modules in the display interface and graphic and textural information in each of the button modules;
   comparing the button modules and the graphic and textural information with a preset recording startup button database, wherein the recording startup button database is a collection of button modules and graphic and textural information for the recording startup button for starting the recording function; and
   determining whether there is the recording startup button in the display interface according to a result of the comparing.

3. The method according to claim 2, further comprising:
   stopping the recording function and acquiring recording information recorded by the recording function; and
   prompting a user to determine whether it is necessary to convert the recording information into text information for transmission.

4. The method according to claim 1, wherein after starting a recording function automatically, the method further comprises:
   determining whether the infrared sensor signal has disappeared, and stopping the recording function in response to determining that the infrared sensor signal has disappeared.

5. The method according to claim 4, further comprising:
stopping the recording function and acquiring recording information recorded by the recording function; and
prompting a user to determine whether it is necessary to convert the recording information into text information for transmission.

6. The method according to claim 1, further comprising:
stopping the recording function and acquiring recording information recorded by the recording function; and
prompting a user to determine whether it is necessary to convert the recording information into text information for transmission.

7. A system for automatically starting recording, comprising:
a display, configured to display a display interface of a terminal device;
a controller, configured to scan the display and detect whether there is a preset recording startup button in the display interface, send a detection instruction to a sensor module in response to detecting a preset recording startup button, receive a sensor signal sent by the sensor module, determine whether the sensor signal meets a preset automatic recording condition, and send a recording startup instruction to a recording circuit in response to determining that the preset automatic recording condition is met;
the sensor module, configured to enable a sensor in response to receiving the detection instruction sent by the controller, and feedback a detected sensor signal to the controller, wherein the sensor module includes an acceleration sensor and an infrared sensor, and wherein the acceleration sensor is configured to detect motion information of the terminal device, and the infrared sensor is configured to detect position information of the terminal device; and
the recording circuit, configured to start a recording function in response to receiving the recording startup instruction sent by the controller,
wherein the controller is configured to determine whether the sensor signal meets a preset automatic recording condition by:
determining whether an acceleration represented by an acceleration sensor signal detected by the acceleration sensor has been subjected to a transition from positive to negative;
determining whether an infrared sensor signal is detected by the infrared sensor in response to determining that the acceleration has been subjected to a transition from positive to negative, and
determining the sensor signal meets the preset automatic recording condition in response to detecting the infrared sensor signal.

8. The system according to claim 7, wherein the controller comprises a central processing unit (CPU) and a microprocessor, and wherein:
the CPU is configured to scan the display and detect whether there is the preset recording startup button in the display interface, and instruct the microprocessor to acquire the sensor signal in response to detecting the preset recording startup button, and
the microprocessor is configured to acquire the sensor signal sent by the sensor module in response to receiving an instruction of acquiring the sensor signal sent by the CPU and determine whether the sensor signal meets the preset automatic recording condition, and instruct the CPU to send the recording startup instruction to the recording circuit in response to determining that the preset automatic recording condition is met.

9. An apparatus for automatically recording comprising the system for automatically starting recording according to claim 7.

10. The apparatus according to claim 9, wherein the controller comprises a central processing unit (CPU) and a microprocessor, and wherein:
the CPU is configured to scan the display and detect whether there is the preset recording startup button in the display interface, and instruct the microprocessor to acquire the sensor signal in response to detecting the preset recording startup button, and
the microprocessor is configured to acquire the sensor signal sent by the sensor module in response to receiving an instruction of acquiring the sensor signal sent by the CPU and determine whether the sensor signal meets the preset automatic recording condition, and instruct the CPU to send the recording startup instruction to the recording circuit in response to determining that the preset automatic recording condition is met.

* * * * *